United States Patent
Mouquet et al.

(10) Patent No.: US 11,601,867 B2
(45) Date of Patent: Mar. 7, 2023

(54) METHOD AND DEVICE FOR MANAGING AN OVERLOAD OF A NETWORK CORE CONTROLLING A MOBILE ACCESS NETWORK

(71) Applicant: Orange, Paris (FR)

(72) Inventors: Antoine Mouquet, Châtillon (FR); Sabine Zander, Châtillon (FR); Bruno Tossou, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/254,082

(22) PCT Filed: Jun. 14, 2019

(86) PCT No.: PCT/FR2019/051439
§ 371 (c)(1),
(2) Date: Dec. 18, 2020

(87) PCT Pub. No.: WO2019/243717
PCT Pub. Date: Dec. 26, 2019

(65) Prior Publication Data
US 2021/0266819 A1    Aug. 26, 2021

(30) Foreign Application Priority Data

Jun. 20, 2018 (FR) ...................................... 1855460

(51) Int. Cl.
*H04W 48/06* (2009.01)
*H04W 76/25* (2018.01)
(Continued)

(52) U.S. Cl.
CPC ....... *H04W 48/06* (2013.01); *H04W 28/0247* (2013.01); *H04W 28/0284* (2013.01);
(Continued)

(58) Field of Classification Search
CPC ............ H04W 48/06; H04W 28/0247; H04W 28/0284; H04W 28/0289; H04W 76/11;
(Continued)

(56) References Cited

U.S. PATENT DOCUMENTS

| | | |
|---|---|---|
| 2016/0029246 A1 | 1/2016 | Mishra et al. |
| 2018/0317163 A1* | 11/2018 | Lee ........................ H04W 68/02 |
| 2020/0092425 A1* | 3/2020 | Hietalahti ............. H04W 60/00 |

OTHER PUBLICATIONS

Huawei and U.S. Cellular, "Enhancement for MME Overload Control", Oct. 10-14, 2016, 3GPP. (Year: 2016).*

(Continued)

*Primary Examiner* — Peter P Chau
(74) *Attorney, Agent, or Firm* — Knobbe, Martens, Olson & Bear, LLP (57) ABSTRACT

A management method is described, the management method implemented by a core network entry device. The method comprises, for at least one terminal connected to the mobile access network via an access point, following the receipt of an NAS request from the terminal, detecting whether a contention period is associated with this terminal. If not, a contention period to be applied for sending NAS requests to the network core is associated with and transmitted to the terminal. If a contention time is associated with the terminal and has not been respected by the terminal a temporary identifier allocated to the terminal for communicating with the network core is sent to the terminal via the access point, and a control message comprising at least a part of the temporary identifier is sent to the access point, the control message requiring blocking by the access point of all or part of the requests sent by a terminal which contains at least one part of the temporary identifier.

18 Claims, 3 Drawing Sheets

(51) Int. Cl.
*H04W 76/11* (2018.01)
*H04W 28/02* (2009.01)

(52) U.S. Cl.
CPC ........ *H04W 28/0289* (2013.01); *H04W 76/11* (2018.02); *H04W 76/25* (2018.02)

(58) Field of Classification Search
CPC ....... H04W 76/25; H04W 8/04; H04W 76/18; H04L 47/26
See application file for complete search history.

(56) References Cited

OTHER PUBLICATIONS

Huawei and U.S. Cellular, "Enhancement for MME Overload Control", Nov. 14-18, 2016, 3GPP. (Year: 2016).*
International Search Report and Written Opinion dated Aug. 20, 2019 for Application No. PCT/FR2019/051439.
"3rd Generation Partnership Project; Technical Specification Group Services and System Aspects; System Architecture for the 5G System; Stage 2 (Release 15)" 3GPP Standard; Technical Specification; 3GPP TS 23.501, 3rd Generation Partnership Project (3GPP), Mobile Competence Centre; 650, Route Des Luc/Oles; F-06921 Sophia-Antipolis Cedex, France, vol. SA WG2, No. VI5.2.0, Jun. 19, 2018 (Jun. 19, 2018), pp. 1-217.
Cisco. "MTC Congestion Control" Aug. 8, 2016 (Aug. 8, 2016), pp. 1-20, Retrieved from the Internet: https://www.cisco.com/c/en/us/td/docs/wireless/asr_5000/20/SGSN1b_20_SGSN_Admin/b_20_SGSN_Admin_chapter_010101.pdf [retrieved on Oct. 16, 2018].
Ericsson. "Clarifications for Overload Start triggered UE rejections" vol. RAN WG3. No. Tenerife, Spain; Apr. 20, 2015-Apr. 24, 2015. Apr. 11, 2015 (Apr. 11, 2015). 3GPP Draft; R3-15079I_RAN_SHARING_STAGE2_CR_OVERLOAD. 3rd Generation Partnership Project (3GPP). Mobile Competence Centre; 650. Route Des Lucioles ; F-06921 Sophia-Antipolis Cedex ; France. Retrieved from the Internet: http://www.3gpp.org/ftp/Meetings_3GPP SYNC/RAN3/Docs/ [retrieved on Apr. 11, 2015].
French Search Report dated Oct. 22, 2018 for Application No. 1855460.

* cited by examiner

METHOD AND DEVICE FOR MANAGING AN OVERLOAD OF A NETWORK CORE CONTROLLING A MOBILE ACCESS NETWORK

RELATED APPLICATIONS

This application is the U.S. National Phase of Application No. PCT/FR2019/051439 entitled "METHOD AND DEVICE FOR MANAGING AN OVERLOAD OF A NETWORK CORE CONTROLLING A MOBILE ACCESS NETWORK" and filed Jun. 14, 2019, which claims the benefit of French Patent Application No. 1855460, filed Jun. 20, 2018, each of which is incorporated by reference in its entirety.

BACKGROUND OF THE INVENTION

The invention relates to the general field of telecommunications and more particularly concerns the management of an overload state of a core network controlling a mobile access network, for example in the context of a fourth-generation (4G) or fifth-generation (5G) mobile network.

In 4G and 5G mobile networks, mechanisms are provided to respond to overload situations which may affect the core networks of these mobile networks. It is noted in this respect that methods known per se allow load balancing between several peer core network nodes serving one same access point, as described in specifications 3GPP TS 23.401 v15.3.0 (under paragraph 4.3.7.2) and TS 36.401 (under paragraph 7.2.10) for 4G; once said method is implemented, it can be assumed that the overload of one core network node indicates a general overload of the core network, at least for the technological generation and geographical region concerned. At all events, in the present document, «core network overload» indifferently designates the overload of one particular node of the core network or the general overload of the core network.

These mechanisms, to respond to overload situations, particularly operate at the Non-Access Stratum (NAS). This non-access stratum, as is known in a mobile telecommunications system, designates a functional layer between the core network and a terminal connected to the access network. It manages the setting-up of communication sessions between the terminal and the mobile network and is used to maintain continuity of the communication with the terminal as it moves. This NAS layer is opposed to the access stratum AS which is in charge of conveying data on the radio portion (i.e. wireless) of the mobile network (in other words at the mobile access network) and of managing the radio resources of the access network.

These mechanisms are described for example in specification document TS 23.060 § 5.3.6.2, v15.2.0 (March 2018) for 2G and 3G mobile networks, in specification document 3GPP TS 23.401 v15.3.0 (under paragraph 4.3.7.4.2) for 4G mobile networks, and in specification document 3GPP TS 23.501 v15.1.0 (under paragraph 5.19) for 5G mobile networks. They are intended to be implemented by the nodes positioned at the input of the core network; said node is typically a SGSN gateway (Serving GPRS Support Node) for 2G and 3G mobile networks, MME equipment (Mobility Management Entity) for a 4G mobile network, or AMF equipment (Access and Mobility Function) associated with SMF equipment (Session Management Function) for a 5G mobile network.

More specifically this core network node, when it determines that the core network is in an overload situation and receives an NAS request from a user terminal wishing for example to set up a communication session to communicate on the mobile network, can refrain from processing the terminal's NAS request and associate a backoff time with the terminal. This backoff time is intended to delay the sending of new NAS requests by the terminal to the core network so as to prevent further overload thereof. The node sends the terminal the backoff time it has been allocated in response to the terminal's NAS request. When the terminal receives the reply to its NAS request containing said backoff time, it is supposed not to send any new NAS request to the core network for as long as this backoff time has not expired, or for as long as it does not receive a paging request from the network.

In practice some terminals do not apply this operating mode correctly: they do not pay heed to their allocated backoff time and re-emit NAS requests before the expiry of the backoff time. Even though the node located at the input of the core network will reject these NAS requests and does not transmit these to the core network for processing, such terminal behaviour produces additional signalling flows which must be managed at the access network and at the core network, in particular by the node located at the input thereof. This has a negative impact both on the level of overload of this node and on the time during which this node remains in said overload state: in the event of major overload of the core network, said behaviour is particularly inappropriate and opposes rapid restoring of the overload situation in the core network.

It is to be noted that with the coming onto the market of large populations of connected objects supplied by a plurality of different manufacturers and intended to be used in particular on 4G and 5G networks, an increase in this type of inappropriate behaviour can be expected.

Subject and Summary of the Invention

The invention concerns a method for managing an overload state of a core network controlling a mobile access network, this management method being intended to be implemented by a device located at the entry of the core network (also called herein core network entry device), this management method for at least one terminal connected to the mobile access network via an access point and managed by the device, following the receipt of a non-access stratum request called NAS request sent by the terminal, comprising:
  a step to detect whether a backoff time is associated with this terminal;
  if no backoff time is associated with the terminal, a step to associate with and a step to transmit to said terminal a backoff time intended to be applied by the latter for sending NAS requests to the core network.

The management method is noteworthy in that, if at the detection step it is detected that a backoff time is associated with the terminal and has not been heeded by the latter, it further comprises a step to send the terminal by the core network entry device, via the access point, a temporary identifier allocated to the terminal for communicating with the core network, and a step to send the access point, via the core network entry device, a command message comprising at least part of said temporary identifier, this command message requesting blocking by the access point of all or some of the requests emitted by a terminal which contain said at least part of the temporary identifier.

Correlatively, the invention also concerns a core network entry device controlling a mobile access network, capable of managing an overload state of the core network and comprising:

a receiver module able to receive a non-access stratum request (NAS request) from at least one terminal connected to the mobile access network via an access point and managed by the device;

modules, activated for at least one said terminal by the receiver module following the receipt of an NAS request from this terminal, these modules comprising:

a detection module configured to detect whether a backoff time is associated with said terminal; and         as association module, activated if no backoff time is associated with the terminal, and configured to associate with and to transmit to said terminal a backoff time intended to be applied by the latter for sending NAS requests to the core network.

This device is noteworthy in that it further comprises a send module activated if the detection module detects that a backoff time is associated with the terminal and has not been heeded by the latter, this send module being configured to send the terminal, via the access point, a temporary identifier allocated to the terminal for communicating with the core network, and to send the access point a command message comprising at least part of said temporary identifier, this command message requesting blocking by the access point of all or some of the requests emitted by a terminal which contain said at least part of the temporary identifier.

The invention therefore proposes a method allowing efficient management of an overload state of the core network of a mobile network, which takes into account the inappropriate behaviour of some terminals which do not heed the backoff times allocated thereto by the core network entry device in said overload state. This method is based on the filtering of requests emitted by these terminals at the mobile access network i.e. before they reach the core network to prevent further aggravation of its overload state.

To allow this filtering, the management method of the invention advantageously provides for the allocation of dedicated temporary identifiers for communicating with the network allocated to terminals whose requests must be filtered by the access network, and for the transmission of these identifiers to all or some of the access points of the access network, or at least a representative part of these identifiers able to be used by the terminals when communicating via the access points (in other words a part enabling the access points to identify the requests sent by the terminals concerned). In this manner, the access points can easily discriminate those terminals which do not heed their backoff times and prevent any connection to the network by the latter when this blocking is requested by the core network entry device (in particular in the event of overload). As a result, the requests emitted by these «illicit» terminals, and a fortiori the NAS requests emitted by these illicit terminals, are not transmitted to the core network during these periods of selective blocking.

It is noted that, as is conventional, the terminals are allocated a temporary identifier (Globally Unique Temporary Identifier—GUTI) for 4G and 5G networks as soon as they subscribe to the network, the network being able to decide at any time to change a terminal's temporary identifier. The conventional use of temporary identifiers instead of a permanent identifier (IMSI) preserves user anonymity (i.e. prevents illicit tracking of a user). The invention, in one particular embodiment, proposes replacing this conventional temporary identifier by a temporary identifier dedicated to implementing the invention at least one part of which is mentioned in said command message sent to the access points so that they can discriminate the requests they are to filter.

By filtering «illicit» requests emitted by the terminals at the mobile access network, the invention allows the resilience of the mobile network to be improved and contributes towards return of its core network to a normal load state. The fact that it is a device located at the input of the core network which manages the allocation of temporary identifiers and has the initiative of blocking illicit requests from these terminals at the access points of the mobile access network, means that it is possible to take action upstream of the core network and to prevent further overload thereof. Said core network entry device configured to implement the management method of the invention is for example:

SGSN equipment (Serving GPRS Support Node) when the mobile access network is a second or third generation network; or     MME equipment (Mobility Management Entity) when the mobile access network is a fourth-generation network; or     AMF equipment (Access and Mobility management Function) optionally associated with SMF equipment (Session Management Function) when the mobile access network is a fifth-generation network.

It is noted that conforming to the invention, the access point(s) of the mobile access network is/are configured via the command message sent by the core network entry device to block either all the requests sent by a given terminal, or only some of the requests emitted by this terminal. For example, the command message may request blocking by the access point of all the requests emitted by a terminal which contain said at least part of the temporary identifier allocated to this terminal, with the exception of requests relating to an emergency service. The invention therefore offers the possibility to modulate the filtering operated by the access point to take into account exceptional situations such as an emergency situation.

Similarly, it can be envisaged in one particular embodiment, that the core network entry device excludes application of the management method of the invention for some categories of terminals (e.g. as a function of the subscription taken out by the terminal users with the mobile network, or of a priority associated with some terminals).

In one particular embodiment the management method— if at the detection step it is detected that a backoff time is associated with the terminal and has not been heeded by this terminal—further comprises a step to increment a global counter of so-called illicit NAS requests associated with a group comprising a plurality of so-called illicit terminals managed by the core network entry device and not heeding the backoff times allocated thereto, the step to send the command message to the access point being triggered when the core network entry device detects that the global counter is higher than a predetermined threshold.

In other words, the triggering event for sending the command message to the access point and filtering by the latter of requests emitted by the terminals in the illicit group is the crossing of a predetermined threshold by a counter of illicit requests managed by the core network entry device. This threshold can typically be set so as to prevent the overload state of the network from reaching a level of seriousness that is too high, having particular regard to the initial sizing of the core network and/or the impact of illicit NAS requests on the state of the core network. This embodiment offers the possibility of modulating the blocking of illicit requests by terminals as a function of an objective criterion taking into consideration the presence or absence of a critical situation concerning these illicit requests in relation to the state of the core network.

In one variant of embodiment, it can be envisaged that the step to send the command message to the access point is triggered when the core network entry device detects a load level of the core network higher than a predetermined threshold.

This embodiment allows the application of a management policy of core network congestion without waiting until it has reached a threshold that is too critical.

In one particular embodiment, the command message comprises at least part of each temporary identifier allocated to each terminal in the group of illicit terminals for communicating with the core network, the command message requesting blocking by the access point of all or some of the requests which contain said parts of the temporary identifiers allocated to the terminals in the group of illicit terminals.

This embodiment allows limiting of the signalling exchanged between the core network entry device and the access points of the mobile access network to activate blocking of illicit requests sent by the terminals. There follows a limited impact on exchanged signalling to implement the invention on the overload state of the core network.

In one particular embodiment, the management method—if at the detection step it is detected that a backoff time is associated with the terminal and is not heeded by this terminal—further comprises a step to increment a counter of illicit NAS requests specific to the terminal, the temporary identifier being allocated to the terminal by the core network entry device when said device detects exceeding of a predetermined threshold by the counter specific to the terminal.

With this embodiment it is possible only to trigger allocation to a terminal of a temporary identifier by the core network entry device when the behaviour of the terminal is considered to be detrimental to overload of the core network, by suitably configuring the value of the threshold triggering this allocation. In this manner, it is possible to reduce the workload required of the device to allocate new temporary identifiers to terminals which send few illicit requests to the core network, and to prevent blocking of access for terminals which may effectively have sent few illicit requests but which are not significantly detrimental to the network load.

In one particular embodiment of the invention, the temporary identifier allocated to the terminal is a globally unique temporary identifier or GUTI such as defined in specification 3GPP TS 23.003, v15.3.0.

It is noted that by «such as defined in specification 3GPP TS 23.0003 v15.3.0» it is meant herein that the unique global temporary identifier is defined in identical manner to the description in specification 3GPP TS 23.003, v15.3.0. However, this does not exclude that identical definitions are given in prior versions of specification document TS 23.003 (possibly relating to the same release or to prior releases) and that the unique global temporary identifier allocated in the invention also conforms to the definition given in these prior versions.

This embodiment has a particular advantage since, as temporary identifier to implement the invention, it proposes a GUTI identifier such as it is currently allocated to terminals on 4G and 5G mobile networks when they are attached to these networks. As previously mentioned, this GUTI identifier as is known per se allows the providing of a unique identity to a terminal for communicating on the mobile network (and particularly with the core network) without disclosing the unique confidential identification stored in the SIM card (also known as IMSI for International Mobile Subscriber Identity). It is typically allocated to terminals at the time of their attachment to the mobile network by the core network entry device responsible for managing the mobility of the terminals within the mobile network, and in particular by the MME device for 4G networks and AMF device for 5G networks. In this embodiment the invention therefore allows the reliance on procedures for the allocation and transmission of temporary identifiers that are already provided and used in normalised mobile networks, and hence allows simplified implementation of the invention. In particular, for terminals this embodiment allows fully transparent implementation of the invention.

Similarly, in one particular embodiment of the invention, the command message is an OVERLOAD START message such as defined in specification 3GPP TS 23.401 v15.3.0 or in specification 3GPP TS 23.501 v15.1.0, modified according to the invention to request blocking by the access point of all or some of the requests emitted by a terminal which contain said at least part of said temporary identifier.

As mentioned previously for GUTI, prior versions of the aforementioned specifications can also be considered if they define an OVERLOAD START message such as the one described in specification 3GPP TS 23.401 v15.3.0 or specification 3GPP TS 23.501 v15.1.0.

The invention can therefore be implemented in simplified manner by using existing signalling in normalised 4G and 5G networks. It is noted however that, conforming to the invention, the command message contains data for which provision is not currently made in the OVERLOAD START message defined by the aforementioned specifications, namely all or part of the temporary identifiers allocated to terminals for which the access point must filter requests, and optionally characterization of the requests sent by these terminals which may or may not have to be filtered. Provision must therefore be made in this embodiment to adapt the OVERLOAD START message described in specifications 3GPP TS 23.401 and TS 23.501 so that it is possible to insert therein the aforementioned data (e.g. via the adding of an additional field, or additional parameter, or additional values of parameters or of already-existing fields, etc.).

In one particular embodiment the management method of the invention—on detection by the core network entry device of ceasing of the overload state of the core network—further comprises a step to send the access point a message to deactivate blocking of the requests.

With this embodiment, when the core network is no longer in an overload state, it is possible to cancel filtering of the requests implemented by the access point.

In one particular embodiment, the deactivation message is an OVERLOAD STOP message conforming to specification 3GPP TS 23.401 v15.3.0 or to specification 3GPP TS 23.501 v15.1.0.

As mentioned previously for GUTI, prior versions of the aforementioned specifications can also be considered if they define an OVERLOAD STOP message such as described in specification 3GPP TS 23.401 v15.3.0 or specification 3GPP TS 23.501 v15.1.0.

In one particular embodiment, the management method comprises a step to allocate a new temporary identifier to said at least one terminal and a step to send this new temporary identifier to said at least one terminal for communicating with the core network.

The allocation and send steps for example can follow after detection by the core network entry device of ceasing of the overload state of the core network, or on detection of other events such as detection of correction of the inappropriate functioning mode by the terminal under consideration in relation to the backoff time allocated thereto. This embodiment allows extraction, by the core network entry device, of the terminal under consideration from the group of terminals considered to be illicit and which may be filtered. It also allows, without having to act on the access point, deactivation of filtering by the access point of requests sent by this terminal (since the terminal will therefore no longer use the temporary identifier communicated to the access point), without having to deactivate the filtering of requests sent by other illicit terminals.

As it will appear in the light of the foregoing, the invention is based on management of the overload state of the core network by the core network entry device, but also on configuration by this device of the access points of the mobile access network with at least part of the temporary identifiers allocated to terminals responsible for sending illicit NAS requests to the core network, so that the access points filter future requests sent by these terminals and do not transmit these to the core network.

Therefore, in another aspect, the invention also concerns a method for processing requests, intended to be implemented by an access point of a mobile access network controlled by a core network, this method comprising:
  a step to receive, from a core network entry device, a command message comprising at least part of at least one temporary identifier allocated by said device to at least one terminal managed by this device for communicating with the core network and which has not heeded a backoff time with which it has been associated, said at least part of said at least one temporary identifier being used by said at least one terminal when communicating with said access point, and enabling the access point to identify requests sent by said terminal, this command message requesting blocking by the access point of all or some of the requests emitted by a terminal which contain said at least part of said temporary identifier;
  on receipt of a request sent by a terminal:
    a step to verify whether the received request comprises said at least part of said at least one temporary identifier included in the command message and is to be blocked conforming to the command message;
    if applicable, a step to block said request by the access point;
    otherwise, a step to transmit said request to the core network entry device.

Correlatively, the invention further concerns an access point of a mobile access network controlled by a core network, this access point comprising:
  a receiver module able to receive from a core network entry device a command message comprising at least part of at least one temporary identifier allocated by said device to at least one terminal managed by this device for communicating with the core network and which has not heeded a backoff time with which it has been associated, said at least part of said at least one temporary identifier being used by said at least one terminal when communicating with said access point and enabling the access point to identify requests sent by said terminal, this command message requesting blocking by the access point of all or some of the requests emitted by a terminal which contain said at least part of said temporary identifier;
  modules, activated on receipt of a request sent by a terminal, and comprising:
    a verification module, configured to verify whether the received request comprises said at least part of said at least one temporary identifier included in the command message, and is to be blocked conforming to the command message;
    a blocking module, activated when applicable, to block the request at the access point;
    a transmission module, otherwise activated, and configured to transmit the request to the core network entry device.

According to another aspect, the invention concerns a communication system comprising:
  a core network entry device of the invention controlling a mobile access network; and
  at least one access point of the mobile access network conforming to the invention.

The processing method, access point and communication system of the invention benefit from the same aforementioned advantages as the core network entry device and the management method of the invention.

In one particular embodiment, the different steps of the management method and/or the different steps of the processing method of the invention are determined by computer programme instructions.

The invention consequently also concerns a computer programme on a data medium, this programme able to be implemented in a core network entry device controlling a mobile access network or more generally in a computer, this programme comprising instructions adapted for implementation of the steps of a management method such as described above.

The invention also concerns a computer programme on a data medium, this programme able to be implemented in an access point to a mobile access network or more generally in a computer, this programme comprising instructions adapted for implementation of the steps of a processing method such as described above.

Each of these programmes can use any programming language, and can be in the form of a source code, object code or intermediate code between a source code and object code, such as in a partly compiled form or in any other desirable form.

The invention also concerns a computer-readable data or recording medium, and comprising instructions of a computer programme such as mentioned above.

The data or recording medium can be any entity or device capable of storing the programme. For example, the medium may comprise storage means such as a ROM e.g. a CD ROM or microelectronic circuit ROM, or magnetic recording means e.g. a floppy disc or hard disk.

Additionally, the data or recording medium can be a transmissible medium such as an electrical or optical signal which can be conveyed via an electrical or optical cable, via radio or via other means. The programme of the invention can in particular be downloaded onto a network of Internet type.

Alternatively, the data or recording medium can be an integrated circuit in which the programme is incorporated, the circuit being adapted to execute or to be used in the execution of the method under consideration.

It is also possible, in other embodiments, to envisage that the management method, the core network entry device, the processing method, the access point and the communication system of the invention in combination exhibit all or part of the aforementioned characteristics.

BRIEF DESCRIPTION OF THE DRAWINGS

Other characteristics and advantages of the present invention will become apparent from the description below given with reference to the appended drawings illustrating an example of embodiment that is in no way limiting. In the Figures.

DETAILED DESCRIPTION OF THE INVENTION

Figure 1:
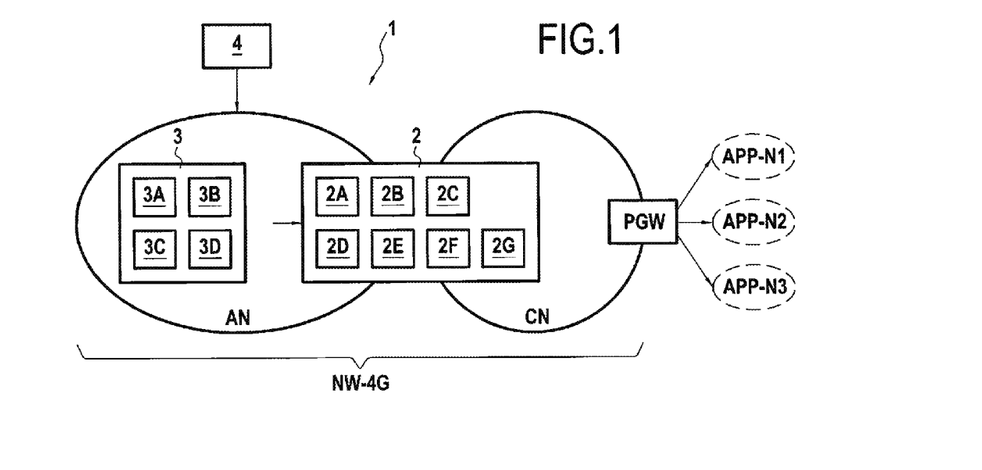
FIG. 1 schematically illustrates a communication system conforming to the invention, in one particular embodiment.

FIG. 1 illustrates a communication system 1 in its environment, conforming to the invention. In the example in FIG. 1, the communication system is contained in a NW-4G mobile network of fourth generation (4G), comprising a mobile access network conforming to the 4G standard, designated AN and a core network designated CN controlling the mobile access network AN. The core network CN enables the different users of the NW-4G mobile network, via a PGW gateway (Packet Data Network GateWay), to access via their respective terminals the various application services provided by different remote networks e.g. an IMS public telephone network (IP Multimedia Subsystem) designated APP-N1, the public internet network designated APP-N2, a private network designated APP-N3, etc.

It is noted that in the example envisaged in FIG. 1, the NW-4G mobile network is a 4G network. However, this hypothesis is not limiting per se, and the invention applies to other mobile networks, for example to 5G mobile networks.

In manner known per se, the core network CN at its input comprises a mobility management device 2 also designated MME, managing a plurality of terminals. This MME device 2 strictly speaking is the first node of the core network CN (entry device of the core network CN in the meaning of the invention), and is connected to the access points 3 of the mobile access network AN. The access points 3, in the example of a 4G mobile network envisaged here, are typically base stations of eNodeB type with which the terminals subscribed to the mobile network communicate via a radio link conforming to the 4G standard. For reasons of simplification in FIG. 1, consideration is given to a single base station eNodeB 3 connected to the MME device 2 of the core network CN.

The base station eNodeB 3 enables a mobile terminal 4 managed by the MME device 2 to emit and receive communications on the 4G mobile network. The managing of communication sessions of terminal 4 on the mobile network and the maintaining of these sessions as the terminal 4 moves is obtained in manner known per se via a functional layer called «non-access stratum» (or NAS layer), provided between the terminal 4 and the core network CN. Typically, the mobile terminal 4 sends the core network CN, and in particular the MME device 2, so-called NAS requests relating to this non-access stratum as soon as it wishes to set up a communication session on the mobile network. These NAS requests are conveyed via radio signal emitted by the mobile terminal 4 and received by the base station eNodeB 3, which relays the same to the MME device 2 for processing.

In conformity with the 4G standard and in particular with the mechanism provided in specification document 3GPP TS 23.401 v15.3.0 under paragraph 4.3.7.4.2, when the MME device 2 detects that the core network CN is in an overload state, it allocates a backoff time to the mobile terminal from which the NAS request is received and which cannot be processed on account of overload of the core network CN. This backoff time is intended to delay the sending of a new NAS request by the mobile terminal under consideration to prevent further overload of the core network CN. The MME device 2 informs the mobile terminal of the backoff time allocated thereto in the reply sent back to its NAS request. When the mobile terminal receives the reply from the MME device 2, and if it contains a backoff time, it is supposed not to send any new NAS request to the core network CN for as long as the backoff time has not expired, or for as long as it does not receive a paging request from the mobile network. In practice, as mentioned previously, some mobile terminals which can communicate on the NW-4G mobile network do not heed this functioning mode and unduly re-emit their NAS requests without taking into account the backoff time they have been allocated. It is assumed here that this is the case of the mobile terminal 4. In this document, the NAS requests emitted by the terminals connected to the NW-4G mobile network which do not heed the backoff time are termed "illicit NAS requests".

According to the invention, the communication system 1 allows improved resilience of the NW-4G mobile network when an overload of the core network CN is detected, and when a certain number of terminals such as mobile terminal 4 do not heed the mechanisms provided by the 4G standard in said situation. As is further detailed below, no limitation is attached to the manner in which the overload state of the core network is detected. To improve the resilience of the NW-4G mobile network, the MME device 2 of the communication system 1 is configured to implement a method for managing an overload state of the core network CN according to the invention, this method being based on analysis of the NAS requests it receives from the terminals that it manages and which communicate on the NW-4G mobile network, and more particularly here the mobile terminal 4 for illustration. The MME device 2 is therefore a device located at the input of the core network CN and also called a core network entry device according to the invention.

Figure 2:
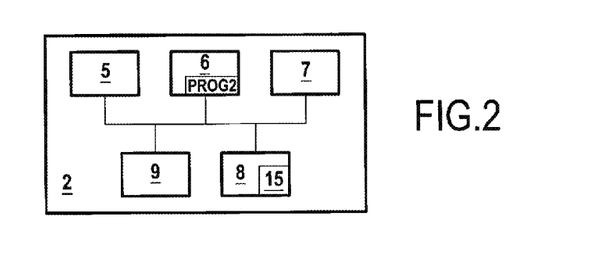
FIGS. 2 and 3 respectively illustrate the material architecture of a core network entry device controlling a mobile access network, and of an access point of this mobile access network conforming to the invention and belonging to the communication system in FIG. 1.

In the embodiment described here, the MME device 2 has the material architecture of a computer such as schematically illustrated in FIG. 2.

It notably comprises a processor 5, a read-only memory 6, a random-access memory 7, a non-volatile memory 8 and communication means 9. These communication means 9 enable the MME device 2 to communicate with the base stations eNodeB 3 of the mobile access network AN (in other words with the access points of the mobile access network AN), and via these base stations eNodeB 3 with the terminals connected to the NW-4G mobile network, and also with other equipment of the core network CN.

The read-only memory 6 of the MME device 2 forms the recording medium conforming to the invention, that is readable by the processor 5 and on which a computer programme PROG2 is recorded according to the invention, comprising instructions for execution of a management method according to the invention.

The programme PROG2 defines various functional and software modules here of the MME device 2, capable of implementing the steps of the management method of the invention and using the material elements 5-9 of the MME device 2. These functional modules, in the embodiment described here (cf. FIG. 1), particularly comprise:

a receiver module 2A able to receive NAS non-access stratum requests from terminals connected to the mobile access network which it manages, via the base stations eNodeB of the access network AN (and hence here in particular to receive NAS requests from the mobile terminal 4 connected to the station eNodeB 3);

modules, activated by the receiver module 2A following the receipt of an NAS request from a terminal (e.g. terminal 4) and comprising:

a detection module 2B configured to detect whether a backoff time is already associated with this terminal (e.g. in a context held in its non-volatile memory 8 by the MME device 2 for this terminal); and an association module 2C, activated if no backoff time is associated with the module, and configured to associate with and to transmit to the terminal a backoff time intended to be heeded by the latter for sending its NAS requests to the core network;

modules, activated if the detection module 2B detects that a backoff time is already associated with the terminal and is not heeded by this terminal, these modules in the embodiment described here comprising:

an incrementation module 2D, configured to increment a global counter of illicit NAS requests, denoted CNTG, counting all the illicit NAS requests emitted by the terminals managed by the MME device 2 (or, as a variant, by a sub-group of these terminals), and a counter of illicit requests specific to the terminal under consideration and denoted CNT(TERM), TERM designating the terminal under consideration (here the MME 2 holds a specific counter for each terminal it manages at the origin of illicit NAS requests);

a comparison module 2E, configured to compare the global counter CNTG of illicit NAS requests with a first predetermined threshold THRG, and to compare the specific counter CNT(TERM) with a second predetermined threshold THR;

an allocation module 2F, configured to allocate temporary identifiers to the mobile terminals not heeding their backoff times, activated on detection of predetermined events such as here when the counters specific to these terminals exceed the threshold THR; and a send module 2G, configured to send the access points of the area covered by the MME device 2, and in particular to the access point via which it has received the NAS request from the terminal, a command message comprising at least part of a temporary identifier allocated to the terminal by the MME device 2 via its allocation module 2F, this command message requesting blocking by the access point of all or some of the requests emitted by a terminal which contain said part of the temporary identifier allocated to the terminal. In the embodiment described here, the send module 2G is activated when the comparison module 2E determines that the global counter CNTG has exceeded the first predetermined threshold THRG.

Figure 4:
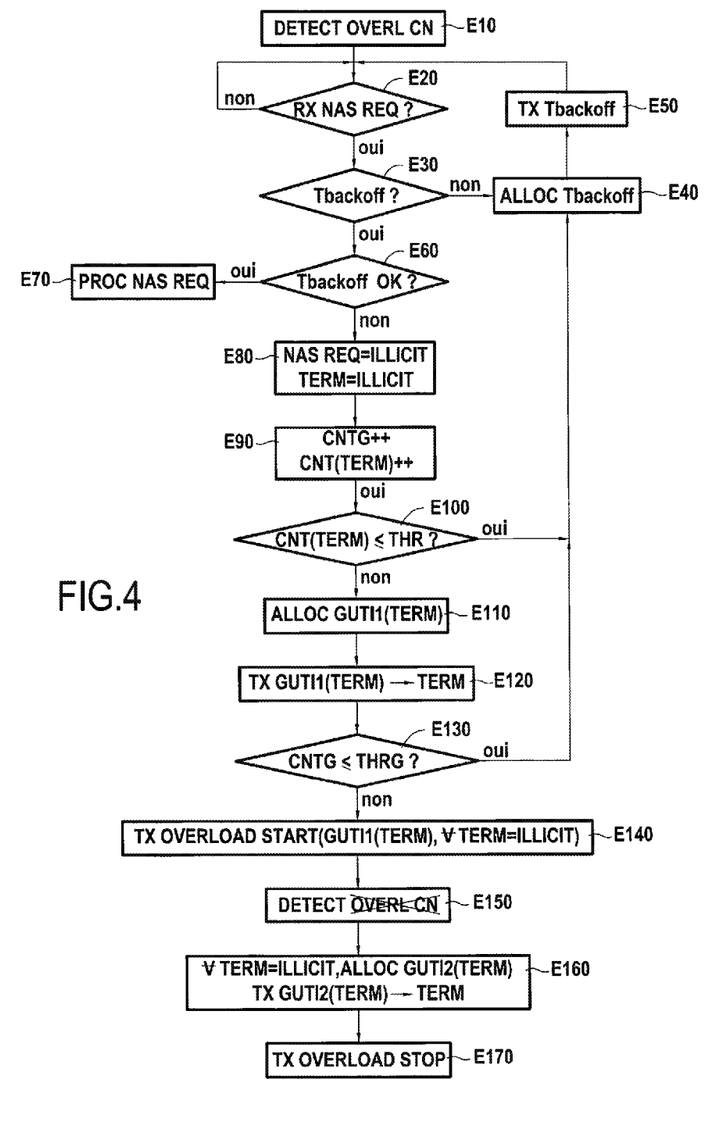
FIG. 4, in the form of a flowchart, illustrates the main steps of the management method of the invention such as implemented in one particular embodiment by the device in FIG. 2.

The functions implemented by the functional modules 2A-2G of the MME device 2 are described in more detail below with particular reference to FIG. 4 illustrating the main steps of the management method of the invention.

Figure 3:
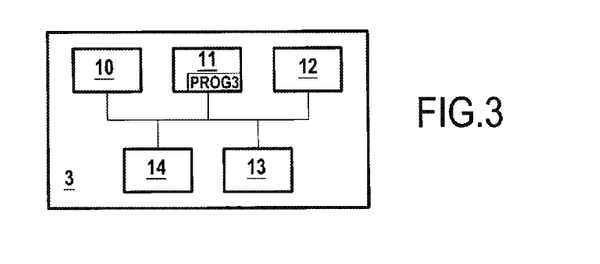

As mentioned previously, the invention to improve the resilience of the NW-4G mobile network, relies not only on the MME device 2 but also on the access points of the access network AN which are configured by the MME device 2 in accordance with the invention to filter requests emitted by terminals which do not heed their allocated backoff times. For this purpose, the access points of the access network AN and in particular the station eNodeB 3 in the example illustrated in FIG. 1, are configured to implement the processing method of the invention; they are therefore access points conforming to the invention to the mobile access network AN In the embodiment described here, the access point (i.e. station eNodeB) 3 has the material architecture of a computer such as schematically illustrated in FIG. 3.

It notably comprises a processor 10, a read-only memory 11, a random-access memory 12, a non-volatile memory 13 and communication means 14. These communication means 14 enable the station eNodeB 3 to communicate via radio link with terminals connected to the NW-4G mobile network (and in particular with mobile terminal 4), and with equipment of the core network CN such as typically the MME device 2 managing these mobile terminals e.g. via wire link The read-only memory 11 of the station eNodeB 3 forms a recording medium conforming to the invention, readable by the processor 10 and on which there is recorded a computer programme PROG3 conforming to the invention comprising instructions for execution of a processing method of the invention.

The programme PROG3 defines various functional and software modules here of the station eNodeB 3, capable of implementing the steps of the processing method of the invention and using material elements 10-14 of the station eNodeB 3. These functional modules here particularly comprise (cf. FIG. 1):

a receiver module 3A able to receive from an entry device of the core network CN, namely the MME device 2 in the example envisaged in FIG. 1, a command message comprising at least part of at least one temporary identifier allocated by the MME device 2 to at least one terminal (in particular mobile terminal 4 in the illustrative example described here), this command message requesting blocking by the station eNodeB 3 of all or some of the message emitted by said at least one terminal which contain said at least part of said at least one temporary identifier;

modules, activated on receipt of a request sent by a terminal connected to the NW-4G mobile network (e.g. terminal 4), and comprising:

a verification module 3B, configured to verify whether the received request comprises said at least part of said at least one temporary identifier included in the command message, and is to be blocked conforming to this command message;

a blocking module 3C, activated when applicable, to block the message at the station eNodeB 3, in other words not to transmit the same to the core network; and a transmission module 3D, otherwise activated, and configured to transmit the request to the entry device of the core network CN i.e. here the MME device 2.

Figure 5:
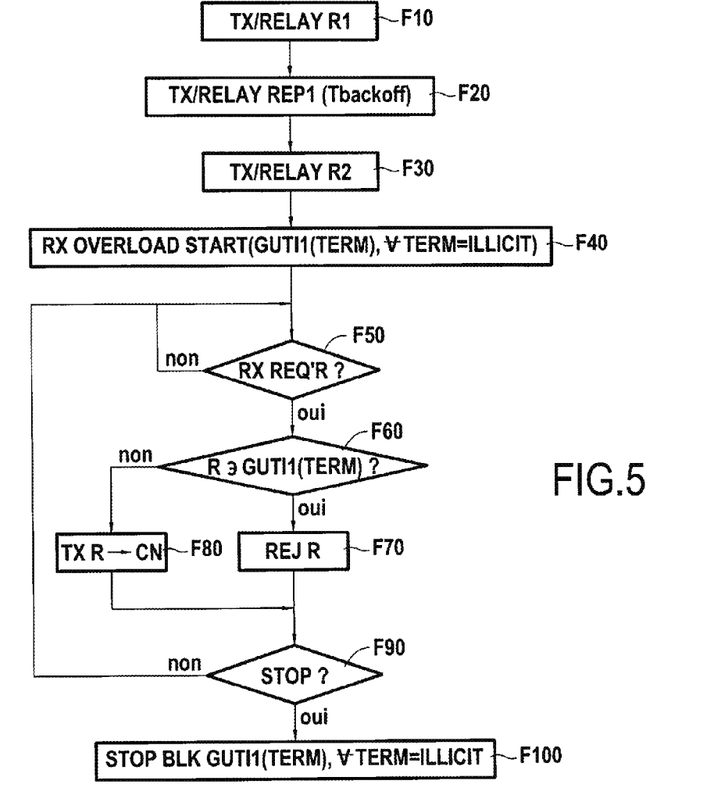
FIG. 5, in the form of a flowchart, illustrates the main steps of the processing method of the invention such as implemented in one particular embodiment by the access point in FIG. 3.

The functions implemented by the functional modules 3A-3D of the station eNodeB 3 are described in more detail below with reference to FIG. 5 illustrating the main steps of the processing method of the invention.

A description is now given, with reference to FIGS. 4 and 5 respectively, of the main steps of a method for managing an overload state of a core network CN, and the main steps of a method for processing a message such as respectively implemented by the MME device 2 and by the station eNodeB 3 in one particular embodiment.

With reference to FIG. 4, it is assumed here that the MME device 2 detects an overload state of the core network (step E10). No limitation is attached to the manner in which the MME device 2 detects said overload state.

For example, the existence of an overload state of the core network CN can be detected in manner known per se by the MME device 2 from the monitoring of:
- computer performance metrics of the occupancy rate of computer resources of the core network CN (e.g. CPU, memory, access rate to mass storage, etc.) by conventional services of the operating system, or indirectly at the orchestration system of the core network; and/or
- application metrics giving consideration to the number of processing operations in progress or on standby (e.g. sessions or requests being processed) at the core network, in relation to the reference sizing of the core network.

The different parameters measured during this monitoring (e.g. periodically) can be compared with predetermined overload thresholds translating that the core network CN is in overload state. Said thresholds can be determined experimentally; for better flexibility, they can be set as a function of the level of seriousness of the overload state on and after which the provider of the NW-4G mobile network wishes to set in operation the management and processing methods of the invention to improve the resilience of the NW-4G mobile network (for example as soon as the onset of overload occurs in the core network, or if it aggravates beyond a predetermined level of seriousness, etc.).

The implementation of the management and processing methods can also be triggered as a function of an estimation made by the MME device 2, further to detection of overload of the core network CN, of the impact of illicit NAS requests on the state of the core network CN and in particular on its load status. This impact can be determined for example by measuring the proportion of illicit NAS requests received by the MME device 2 compared with all traffic, then by evaluating the necessary increase in resources to be provided at the core network CN so that it is possible to process these illicit NAS requests and/or handle resulting quality of service. It is noted that the impact of illicit NAS requests received by the MME device 2 on the resources of the core network CN can go beyond a mere ratio of proportionality if the processing of illicit NAS requests in particular requires the allocation of additional resources per block in the core network CN such as the creation of a new virtual machine for example. The impact on quality of service can indicate lengthening of the queues for example in the core network CN which are incompatible with requirements of reduced latency time.

As a function of the impact thus evaluated of illicit NAS requests on the core network CN and the overload management policy envisaged by the provider of the NW-4G mobile network, the MME device 2 may or may not activate implementation of the management and processing methods of the invention.

It is additionally noted that detection of an overload state of the core network CN and/or estimation of the impact of illicit NAS requests on the state of the core network can be performed by equipment of the core network CN other than the MME device 2, this equipment then being configured to inform the MME device 2 of the state of the core network CN.

In the embodiment described here, it is assumed that detection of an overload state of the core network CN by the MME device 2 at step E10 triggers implementation of the management and processing methods of the invention. This detection also triggers resetting to 0 of the different counters maintained by the MME device 2, and in particular in the embodiment described here of the global counter CNTG of illicit NAS requests emitted by terminals managed by the MME device 2.

It is now assumed that the mobile terminal 4 emits a first NAS request R1 to the core network CN, to set up a communication session on the NW-4G mobile network. The NAS request R1 transits via the station eNodeB 3 which transmits the same to the MME device 2 managing the mobile terminal 4 (step F10 in FIG. 5).

On receipt of the NAS request R1 via its receiver module 2A and communication means 9 (step E20), the MME device 2 detects whether a backoff time has previously been allocated to the mobile terminal 4 (test step E30). For this purpose, the detection module 2B of the MME device 2 for example consults a database 15 stored in its non-volatile memory 8 and containing the contexts previously established by the MME device 2 for the mobile terminals for which it ensures management.

If the detection module 2B does not detect any context in this database 15 relating to the mobile terminal 4, a fortiori and/or no backoff time associated with the mobile terminal 4 (no reply at test step E30), the MME device 2, via its association module 2C, determines for the mobile terminal 4 a suitable backoff time Tbackoff(4) and associates the latter with the mobile terminal 4 in the database 15 (step E40). The association module 2C for this purpose proceeds as described in the 4G standard and particularly in specification 3GPP TS 23.401 v15.3.0 under paragraph 4.3.7.4.2 (the remark previously made regarding application of prior versions of this specification document is applicable). It also stores in the context of the mobile terminal 4 the time of receipt of the NAS request R1 as well as a counter CNT(4) of illicit requests specific to the mobile terminal 4 which it sets at 0.

The association nodule 2C transmits to the mobile terminal 4 the backoff time Tbackoff(4) that it has just allocated thereto in a reply message REP1 to its NAS request R1 (step E50). This reply message REP1 transits via the station eNodeB 3 which relays the same to the mobile terminal 4 (step F20 in FIG. 5).

It is assumed here that despite the backoff time Tbackoff (4) received in the reply message REP1 to its NAS request R1, the mobile terminal 4 sends a new NAS request R2 to set up a communication on the NW-4G mobile network without heeding the backoff time Tbackoff(4), in other words before expiry of the backoff time Tbackoff(4) which it has been allocated. The NAS request R2 termed illicit in this document since it does not pay heed to the backoff time allocated to the mobile terminal 4, transits via the station eNodeB 3 which transmits the same to the MME device 2 (step F30 in FIG. 5).

On receipt of the NAS request R2 via its receiver module 2A and communication means 9 (step E20), the MME device 2 detects whether a backoff time has previously been allocated to mobile terminal 4 (test step E30). For this purpose, as previously described, the detection module 2B of the MME device 2 consults the database 15 stored in its non-volatile memory 8 containing the contexts previously established by the MME device 2 for the mobile terminals for which it ensures management. It detects the existence of a context associated with the mobile terminal 4 in which there is entered the backoff time Tbackoff(4) previously allocated to the mobile terminal and the time of transmission of the backoff time Tbackoff(4) (yes reply at test step E30).

The detection module 2B then verifies whether the backoff time Tbackoff(4) allocated to the mobile terminal 4 has been heeded by comparing with the time elapsed since the time of transmission of the backoff time Tbackoff(4), the time of receipt of the NAS request R2 from the mobile terminal 4, and the backoff time Tbackoff(4) allocated to the mobile terminal 4 (test step E60).

If the elapsed time is longer than the backoff time Tbackoff(4) (yes reply at test step E60), this means that the mobile terminal 4 has heeded the backoff time it has been allocated and the MME device 2 processes the NAS request R2 emitted by the mobile terminal 4 (step E70).

Otherwise, (no reply at test step E60), this means that the mobile terminal 4 has not heeded the backoff time it has been allocated and that the NAS request R2 sent by the mobile terminal 4 is an «illicit» NAS request (step E80). As previously mentioned, it is assumed that this is the case in the example envisaged here of the NAS request R2. In the embodiment described here, the MME device 2 then adds the mobile terminal 4 to a list of so-called illicit terminals listing the terminals it manages and the source of illicit NAS requests, for which it envisages filtering future requests if these prove to be too numerous, as described in more detail below.

Also, on detection of the illicit nature of the NAS request R2, the MME device 2 via its incrementation module 2D, increments the global counter CNTG of illicit NAS requests counting all the illicit requests emitted by the different terminals managed by the MME device 2 (step E90).

In the embodiment described here, the global counter CNTG counts all illicit NAS requests from all the terminals managed by the MME device 2. As a variant, it can be envisaged that this global counter only counts illicit NAS requests emitted by a sub-group of terminals managed by the MME device 2, with the exclusion in particular of illicit requests emitted by some terminals such as terminals considered to have priority for example or belonging to certain users (of which the NAS requests will be processed for example even if they are illicit etc.). In this variant, these «excluded» terminals are not listed either on the list of illicit terminals.

Additionally, in the embodiment described here, the incrementation module 2D also increments the counter CNT(4) of illicit requests specific to the mobile terminal 4 (step E90, incrementation of counters CNTG and CNT(TERM) with TERM=4 in this example).

The MME device 2, via its comparison module 2E, then compares the counter CNT(4) of illicit requests specific to the mobile terminal 4 with a predetermined threshold THR (test step E100). It is noted that the THR threshold can be specific to the mobile terminal 4 or it can be the same for all the terminals managed by the MME device 2.

If the counter CNT(4) is below or equal to the threshold THR (yes reply at test step E100), the MME device 2 repeats steps E40 and E50, and replies to the mobile terminal 4 sending it a reply message REP2 to its NAS request R2 containing the backoff time that it has allocated thereto. This backoff time can be the same as the one previously allocated to the mobile terminal 4 in response to its NAS request R1, or it may be different.

In the embodiment described here, if the counter CNT(4) is above the threshold THR (no reply at test step E100), the MME device 2 via its allocation module 2F allocates a temporary identifier dedicated to the mobile terminal 4 and intended to be used by the mobile terminal 4 for communicating on the NW-4G mobile network and in particular with the core network CN (step E110).

In the embodiment described here, the temporary identifier allocated to the mobile terminal 4 is a Globally Unique Temporary Identifier also known as GUTI such as conventionally allocated to a terminal for communicating on a mobile network (and in particular on a 4G or 5G network), when the terminal is first attached to the network. Said GUTI identifier is described for example in document 3GPP TS 23.003 v15.3.0 under paragraph 2.8.1 (the remark previously made regarding the application of prior versions of this specification document are applicable).

Figure 6:
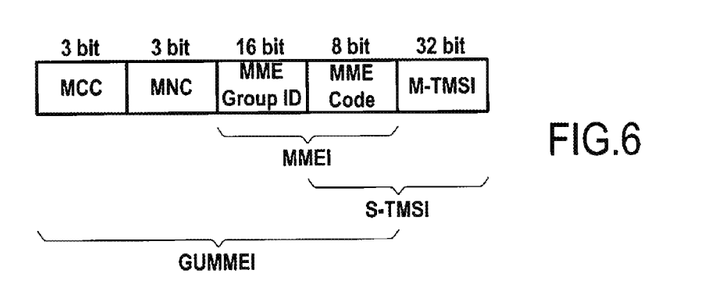
FIG. 6 shows the different fields of a GUTI temporary identifier such as defined by standard 3GPP.

This GUTI identifier, in the state of the art, allows the providing of a unique identifier to the terminal for communicating on the NW-4G mobile network without disclosing the unique, private, confidential identification stored in the terminal's SIM card (also known under the name IMSI for International Mobile Subscriber Identity). The GUTI identifier, as illustrated in FIG. 6, is composed of:

- a first part uniquely identifying the MME device managing the terminal under consideration, also known under the name GUMMEI (Global Unique Mobility Management Entity Identifier). The GUMMEI identifier is constructed from the country code (MCC), the provider code (MNC) and the identifier of the MME device or MMEI (MME Identifier), the MMEI identifier itself being composed of an MME group identifier (or MME Group ID) and an MME code; and
- a second part uniquely identifying the terminal under consideration among the terminals managed by the MME device under consideration, also known as M-TMSI (MME Temporary Mobile Subscriber Identity).

Here, GUTI0(4) is the GUTI identifier allocated to the mobile terminal 4 by the MME device 2 at the time of its attachment to the NW-4G network conforming to the state of the art (i.e. in reply to a NAS attach request sent by the terminal as described for example in specification document 3GPP TS 23.401 v15.3.0 under paragraph 5.3.2.1 (step 17), and which the mobile terminal 4 uses for communicating up until now on the NW-4G network (i.e. this temporary identifier GUTI0(4) is included in all the messages and requests of the mobile terminal 4). In other words, in the embodiment described here, on detection of exceeding of the threshold THR by the counter CNT(4) of illicit NAS requests specific to the mobile terminal 4, the MME device 2 triggers allocation of a new temporary identifier GUTI1(4) to the mobile terminal 4 to replace the temporary identifier GUTI0(4) previously allocated thereto (earlier by the MME device 2) for communicating on the NW-4G mobile network at the time of attachment thereof to the network.

When generating the new temporary identifier GUTI1(4) and in particular the part corresponding to the M-TMSI, the allocation module 2F for example can use a common mask dedicated to illicit terminals (e.g. the first 16 bits of the M-TMSI positioned at 1), combined with an additional element uniquely defining the terminal 4 among the illicit mobile terminals managed by the MME 2 device.

The MME device 2 then communicates to the mobile terminal 4 the temporary identifier GUTI1(4) that it has just allocated thereto for communicating on the NW-4G mobile network and with the core network CN in particular (step E120). For this purpose, it proceeds by including the temporary identifier GUTI1(4) in the reply message REP2 to NAS request R2, or in a «GUTI reallocation» command. This procedure is notably described in documents 3GPP TS 23.401 v15.3.0 under paragraph 5.3.7 and TS 24.301 v15.1.0 under paragraph 5.4.1. Thereafter, the mobile terminal 4 is configured to use this temporary identifier GUTI1(4) when it communicates on the NW-4G mobile network, and in particular when it sends NAS requests to the core network CN. In other words, when the mobile terminal 4 sends a request to the NW-4G mobile network, it includes in this request its new temporary identifier GUTI1(4) by which it is uniquely identified on the NW-4G mobile network.

It is noted that if another type of temporary identifier other than a GUTI is used to implement the invention, the transmission of this temporary identifier to the mobile terminal 4 triggers the configuration of the mobile terminal 4 so that it uses this temporary identifier in its requests sent to the NW-4G mobile network and more particularly to the core network CN.

Also, the MME device 2 stores the temporary identifier GUTI1(4) newly allocated to the mobile terminal 4 in the context associated therewith in the database 15.

It is noted that in the embodiment described here, as temporary identifier an already defined temporary identifier is considered (namely the GUTI) which is conventionally already defined and used on 4G mobile networks to identify a terminal. This allows reliance on procedures already defined in a 4G network to generate GUTIs, to transmit GUTIs to terminals, but also for use of these GUTIs by terminals for communicating on a 4G network, and hence facilitates implementation of the invention. The implementation of the invention in this embodiment is typically transparent for the mobile terminals.

However, this hypothesis is not limiting, and the invention can also rely on another type of temporary identifier other than the temporary identifiers already defined in the standard, provided that it allows unique identification of the mobile terminal 4 on the NW-4G mobile network and is used by the terminal for communicating on the NW.4G network and with the core network CN.

The MME device 2, via its comparison module 2E, then compares the value of the global counter CNTG of illicit NAS requests with a predetermined threshold THRG (test step E130). This threshold THRG is used in the embodiment described here to trigger filtering of illicit NAS requests by the access points of the access network AN. It can be parameterized by the provider of the NW-4G mobile network (and of the core network CN), and is preferably higher than the threshold THR used for the counters specific to the terminals, the counter CNTG being a global counter here counting the illicit NAS requests of all the terminals managed by the MME device 2 (or at least all the terminals listed on the list of illicit terminals kept up to date by the MME device 2). It can be determined as a function in particular of the impact of the illicit requests on the core network CN and/or the overload state thereof.

If the global counter CNTG is below or equal to the threshold THRG (yes reply at test step E130), the MME device 2 repeats steps E40 and E50, as described previously when it detects that the counter CNT(4) is below or equal to the threshold THR.

If the comparison module 2E determines that the global counter CNTG is higher than the threshold THRG (no reply at test step E130), the filtering of illicit NAS requests at the access points of the access network AN is triggered by the MME device 2 conforming to the invention.

For this purpose, the send module 2G of the MME device 2 here sends the station eNodeB 3 a command message comprising the temporary identifiers allocated by the MME device 2 to all the terminals listed on the list of illicit terminals held by the MME device 2 (or at least a representative part of each of these temporary identifiers which is able to be detected by the station eNodeB 3 in the messages sent by the terminals transiting via this station eNodeB 3), and requesting blocking by the station eNodeB 3 of all or some of the requests emitted by these terminals (step E140). These requests can advantageously be identified by the base station eNodeB 3 since they contain the temporary identifiers GUTI1(TERM) allocated by the MME device 2 to the terminals on the list of illicit terminals, or at least the representative part of these temporary identifiers enabling the base station eNodeB 3 to discriminate the requests which are to be filtered.

In one particular embodiment, the command message sent by the send module 2G may only contain the masks used to generate the temporary identifiers GUTI1(TERM) allocated to the terminals on the list of illicit terminals (in other words, solely one part of these temporary identifiers corresponding to the masks used for generation thereof), to block requests comprising temporary identifiers allocated to the terminals which have generated these requests containing the masks under consideration. In practice, other parts of the temporary identifiers can be transmitted to the station eNodeB 3 to identify the requests which are to be filtered, provided that these parts are representative of the identifiers of terminals likely not to heed the backoff times allocated thereto, and provided that the terminals are configured to include at least these parts of the temporary identifiers in the requests they send and which transit by the station eNodeB 3.

In another variant, the temporary identifiers (or part of these temporary identifiers) of the mobile terminals belonging to the list of illicit terminals can be sent separately to the access point 3, for example when the specific counter associated with each of these terminals exceeds a predetermined threshold.

In another variant, the event triggering the sending of the command message to the access point can be the detection of a load level of the core network CN that is higher than a predetermined threshold and considered as requiring action by the device 2 and reinforcing of the congestion policy applied to clear the overload state of the core network CN.

In the embodiment described here, the command message sent by the module 2G to the base station eNodeB 3 is an OVERLOAD START message such as described in specification 3GPP TS 23.401 under paragraph 4.3.7.4.1 for 4G mobile networks, adapted so that it contains part of the temporary identifiers GUTI1(Term) (e.g. in a field provided for this purpose in the OVERLOAD START message), and more particularly that part of these identifiers corresponding to the S-TMSI (denoted S-TMSI1(Term)) which, for each GUTI identifier allocated to a terminal, is composed of the MME code and M-TMSI identifier allocated to this terminal (see FIG. 6). It is to be noted that in 4G mobile networks, the terminals are configured at the non-access stratum (NAS) to use the GUTI identifier in its entirety when communicating with the core network, whilst they communicate with the stations eNodeB at the access stratum using only part of the GUTI namely the part corresponding to the S-TMSI.

It is additionally noted that each S-TMSI extracted from a GUTI temporary identifier allocated to a terminal is itself strictly speaking a temporary identifier allocated to this terminal in the meaning of the invention, and accordingly in the remainder of the description the S-TMSI identifiers are also designated «S-TMSI temporary identifiers».

In another embodiment, the temporary identifiers GUTI1 (Term) are transmitted in their entirety to the base station eNodeB 3 in the command message.

In addition, in the event that only some of the requests emitted by the terminals designated by these identifiers are to be filtered by the access point 3 (e.g. all the requests emitted by the terminals with the exception of those related to an emergency service), an additional mention specifying the requests which are to be filtered or on the contrary specifying those that the access point must let through and transmit to the MME 2 device, is added to the command message sent by the module 2F. It is considered here that if there is no explicit mention in the OVERLOAD START message, the station eNodeB 3 must filter all requests without exception emitted by the terminals of which it has received the temporary identifiers in the command message (or corresponding to the received masks).

It is noted that the command message may further comprise a time indication specifying the period during which the station eNodeB 3 is to filter requests from the terminals on the list of illicit terminals. It is considered here that if no time indication is given in the OVERLOAD START message, the station eNodeB 3 applies filtering of requests until indication to the contrary given by the MME device 2.

In another embodiment, the use can be envisaged of another type of message other than the OVERLOAD START message to activate filtering of requests by the station eNodeB 3, for example a dedicated signalling message for this purpose.

Also, in the example envisaged here, for reasons of simplification, a single station eNodeB 3 attached to the MME device 2 is considered, and therefore also the transmission of the command message containing the identifiers S-TMSI1(TERM) of the illicit terminals to this sole station eNodeB 3. However, when several stations eNodeB are attached to the MME device 2, the latter preferably transmits the command message containing the temporary identifiers of the illicit terminals to be filtered to all the stations eNodeB attached thereto and not only to the stations eNodeB to which the illicit terminals are connected. This allows consideration to be given to possible mobility of the terminals.

With reference to FIG. 5, the station eNodeB 3 via its receiver module 3A and communication means 14, receives the OVERLOAD START command message transmitted by the MME device 2 (step F40), and extracts from this command message the temporary identifiers S-TMSI1 (Term) derived from the temporary identifiers GUTI1 (TERM) (or optionally the masks) of the terminals for which it is to filter requests. It stores these temporary identifiers in memory e.g. in its non-volatile memory 13.

Thereafter, on receipt of a request R emitted by a terminal subscribed with the NW-4G mobile network (yes reply at test step F50), e.g. an RRC Connection Request (such as described in particular in specification document 3GPP TS 36.331 v15.3.0 under paragraphs 5.3.3.1 et 5.3.3.3) emitted by the mobile terminal 4, the station eNodeB 3, via its verification module 3B verifies whether this request contains one of the temporary identifiers S-TMSI1(Term) transmitted in the command message of the MME device 2 (test step F60). In the described embodiment, the temporary identifiers communicated to the station eNodeB 3 being S-TMSI identifiers (used by the terminals at the access stratum), the verification module 3B for this purpose analyses the content of the ue-Identity field in the received request R and compares the S-TMSI identifier contained in this field with the list of temporary identifiers S-TMSI1(TERM) stored in its non-volatile memory 13 (or optionally masks).

In the example described here in which all the requests sent by terminals using the temporary identifiers S-TMSI1 (TERM) are to be filtered unconditionally by the station eNodeB 3, if the S-TMSI identifier included in the request R coincides with one of the temporary identifiers S-TMSI1 (TERM) (or optionally corresponds to one of the stored masks or to the temporary identifier GUTI1(TERM)) (yes reply at test step F60), the station eNodeB 3, via its blocking module 3C blocks the request R: by blocking it is meant here that it does not transmit this request to the core network CN and in particular to the MME device 2, but rejects or destroys the request (step F70). As a result, the filtered terminals are no longer able to aggravate overload of the core network CN with illicit NAS requests since the requests of these terminals are no longer transmitted thereto.

On the contrary, if the S-TMSI identifier included in the request R does not coincide with any of the temporary identifiers S-TMSI1(TERM) (or does not correspond to any stored mask or any stored GUTI), (no reply at test step F60), the station eNodeB 3, via its transmission module 3D, transmits the request R to the MME device 2 (step F80). It is noted that the station eNodeB 3 proceeds in the same manner (i.e. it transmits the request R to the MME device 2) if, despite the fact that the request R contains an S-TMSI identifier coinciding with one of the identifiers S-TMSI1 (TERM), the request R does not meet the blocking criteria optionally mentioned in the command message.

The station eNodeB 3 repeats steps F60 to F80 for each request R sent by the terminals which transits therethrough for as long as it does not receive an instruction to the contrary from the MME device 2 or, in the event that it has received an application period for blocking of requests in the command message, for as long as this period has not expired (no reply at step F90).

It is now assumed here that the MME device 2 detects (itself or via other equipment) that the core network CN is no longer in an overload state (step E150 in FIG. 4).

In the embodiment described here, the MME device 2 is configured, in response to this detection, to deactivate the filtering operated by the station eNodeB 3. For this purpose, the MME device 2, via its send module 2G, transmits a message to the station eNodeB to deactivate the blocking of requests from these terminals (step E170).

In the embodiment described here, if it is estimated that the illicit functioning of a certain terminal has been corrected, the MME device 2 via its allocation module 2F allocates a new temporary identifier GUTI2(TERM) to the terminal so that it can be taken out of the group of illicit terminals (step E160). The allocation at step E160 of a new temporary identifier GUTI2(TERM) to terminals listed on the list of illicit terminals is implemented in the same manner as at step E110 previously described. The temporary identifiers GUTI2(TERM) are then communicated to the corresponding terminals to be used by the latter for communicating on the NW-4G mobile network, in particular with the core network CN, as indicated for step E120. It is noted that step E160 can be implemented indifferently before, after or concomitantly with step E170.

Also, in the embodiment described here, the deactivation message sent by the module 2G to the base station eNodeB 3 is an OVERLOAD STOP message such as described in specification 3GPP TS 23.401 under paragraph 4.3.7.4.1 for 4G mobile networks. Said message is provided in specification 3GPP to cancel the effects of an OVERLOAD START message sent previously.

With reference to FIG. 5, on receipt of the deactivation message OVERLOAD STOP (yes reply at step F90), the station eNodeB 3 stops blocking requests containing the temporary identifiers S-TMSI1(TERM) (step F100). In the embodiment described here, it deletes the temporary identifiers S-TMSI1(TERM) from its non-volatile memory. Thereafter, each request newly received by the station eNodeB 3 is transferred to the MME device 2 without operating any filtering.

In the embodiment described here, it was considered that the temporary identifiers allocated by the MME device 2 to the illicit terminals were GUTI identifiers, and that only part of these identifiers allowing discrimination (i.e. recognition, identification) of the requests sent by these illicit terminals, namely the S-TMSI identifiers, was transmitted to the base stations eNodeB 3, whilst the temporary GUTI identifiers are transmitted in their entirety to the terminals to which they have been allocated. This embodiment allows reuse and optionally adaptation of the allocation, transmission (and message) procedures existing in the state of the art. In another interpretation, it can be considered that the S-TMSI are temporary identifiers in the meaning of the invention allocated to terminals and which are transmitted in their entirety to the stations eNodeB, and integrated in more complete identifiers, namely the GUTIs when they are transmitted to the terminals.

In the embodiment described here, the NW-4G mobile network is a 4G mobile network. However, the invention applies to other mobile networks and in particular to a 5G network. For said 5G network, the core network entry device configured to implement the management method of the invention is AMF equipment for example (Access and Mobility management Function) optionally associated with SMF equipment (Session Management Function) to implement steps E10, E40 and E50 (i.e. for allocation and transmission of backoff times, the AMF equipment on the path between the terminals and the SMF equipment then being configured to memorise the backoff times allocated by the SMF equipment and to transmit these backoff times to the terminals concerned). OVERLOAD START and OVERLOAD STOP messages able to be used to implement the invention are defined by the standard and are notably described in document 3GPP TS 23.501 under paragraph 5.19.5.

The invention just described allows easy improvement of the resilience of the mobile network under consideration. In addition to the management and processing methods of the invention, other measures can be taken to manage the overload state of the core network CN.

For example, the MME device 2 can transmit the permanent or temporary identifiers of the terminals belonging to the list it holds of illicit terminals to other entities of the core network and in particular to Policy and Charging Control entities (PCC) which can apply specific actions to the owners of these terminals, such as reducing their data flowrate or imposing a penalty.

In another example, the provider of the core network CN can use the specific counter CNT(TERM) held by the MME device 2 for each terminal having illicit behaviour to adapt its strategy accordingly on a commercial level: in particular the provider can for example require manufacturers to configure their terminals so that they heed the operating principle recommended by the standard regarding backoff times.

In a further example, the MME device 2 can record the illicit behaviour of each terminal (e.g. in a Charging Data Record (CDR) so that the provider of the core network CN is able to adapt its strategy accordingly with regard to monitoring of the network or to apply a specific charge to the terminal owner for non-heed of the standard.

These examples are evidently given solely for illustration purposes and are not limiting per se.

The invention claimed is:

1. A method for managing an overload state of a core network controlling a mobile access network, said method implemented by a core network entry device, said method comprising, for at least one terminal connected to the mobile access network via an access point and managed by the core network entry device:
   receiving a non-access stratum (NAS) request sent by the at least one terminal;
   determining that a backoff time is associated with the at least one terminal and has not been heeded by the at least one terminal;
   sending to the at least one terminal by the core network entry device, via the access point, a temporary identifier allocated to the at least one terminal for communicating with the core network, and
   sending to the access point, via the core network entry device, a command message comprising at least part of the temporary identifier, the command message requesting blocking by the access point of all or some requests emitted by a sending terminal which contain at least part of said temporary identifier.

2. The method of claim 1 further comprising, upon a determination that a backoff time is associated with the at least one terminal and has not been heeded by the at least one terminal incrementing a global counter of illicit NAS requests associated with a group comprising a plurality of illicit terminals managed by the core network entry device and not heeding backoff times associated therewith, and wherein the sending the command message to the access point is triggered when the core network entry device detects that the global counter is higher than a predetermined threshold.

3. The method of claim 2, wherein the command message comprises at least part of each temporary identifier allocated to each terminal in the group for communicating with the core network, the command message requesting blocking by the access point of all or some requests containing the parts of the temporary identifiers allocated to the respective terminals in the group.

4. The method of claim 1, wherein the step to send the command message to the access point is triggered when the core network entry device detects a load level of the core network higher than a predetermined threshold.

5. The method of claim 1 further comprising, upon the determination that a backoff time is associated with the at least one terminal and has not been heeded by the at least one terminal, incrementing a counter of illicit NAS requests specific to the at least one terminal, the temporary identifier being allocated to the at least one terminal by the core network entry device when the core network entry device detects exceeding of a predetermined threshold by the counter specific to the at least one terminal.

6. The method of claim 1, wherein the temporary identifier allocated to the at least one terminal is a globally unique temporary identifier or GUTI conforming to specification 3GPP TS 23.003, v15.3.0.

7. The method of claim 1, wherein the command message is an OVERLOAD START message conforming to specification 3GPP TS 23.401 v15.3.0 or specification 3GPP TS 23.501 v15.1.0, said OVERLOAD START message being modified to request blocking by the access point or all or some of the requests emitted by said sending terminal which contain at least part of said temporary identifier.

8. The method of claim 1 further comprising, on detection by the core network entry device of ceasing of the overload state of the core network, sending the access point a message to deactivate blocking of the requests.

9. The method of claim 8, wherein the message is an OVERLOAD STOP message conforming to specification 3GPP TS 23.401 v15.3.0 or to specification 3GPP TS 23.501 v15.1.0.

10. The method of claim 1, further comprising:
allocating a new temporary identifier to the at least one terminal, and
sending the new temporary identifier to the at least one terminal for communicating with the core network.

11. The method of claim 1, wherein the command message requests blocking by the access point of all the requests emitted by said sending terminal which contain at least part of the temporary identifier with the exception of requests relating to an emergency service.

12. A method for processing requests, implemented by an access point of a mobile access network controlled by a core network, the method comprising:
receiving, from a core network entry device, a command message comprising at least part of at least one temporary identifier allocated by the core network entry device to at least one terminal managed by the core network entry device for communicating with the core network and which has not heeded a backoff time with which the at least one terminal has been associated, at least part of the at least one temporary identifier being used by the at least one terminal when communicating with the access point, and enabling the access point to identify requests sent by the at least one terminal, the command message requesting blocking by the access point of all or some requests emitted by a sending terminal which contain at least part of said at least one temporary identifier; and
upon receipt of a request sent by said sending terminal:
verifying whether the received request comprises at least part of the at least one temporary identifier included in the command message and is to be blocked conforming to the command message;
upon a determination that the received request comprises at least part of the at least one temporary identifier included in the command message and is to be blocked conforming to the command message, blocking the request by the access point; and
otherwise, transmitting the request to the core network entry device.

13. A computer comprising a processor and a memory, the memory having stored thereon instructions which cause the computer to implement the method of claim 1 when the instructions are executed by the processor.

14. A non-transitory, computer-readable storage medium having stored thereon instructions which cause a processor to implement the method of claim 1 when the instructions are executed by the processor.

15. A core network entry device controlling a mobile access network, the core network entry device capable of managing an overload state of a core network, the core network entry device comprising:
a processor and a receiver configured to receive a non-access stratum (NAS) request from at least one terminal connected to the mobile access network via an access point and managed by the core network entry device, the core network entry device configured to, for the at least one terminal following a receipt of an NAS request from the at least one terminal:
detect whether a backoff time is associated with said at least one terminal;
upon a determination that no backoff time is associated with the at least one terminal, associate with and transmit to the at least one terminal a backoff time intended to be applied by the at least one terminal for sending NAS requests to the core network; and
upon a determination that a backoff time is associated with the at least one terminal and has not been heeded by the at least one terminal, send the at least one terminal, via the access point, a temporary identifier allocated to the at least one terminal for communicating with the core network, and send the access point a command message comprising at least part of the temporary identifier, the command message requesting blocking by the access point of all or some requests emitted by a sending terminal which contain at least part of the temporary identifier.

16. An access point of a mobile access network controlled by a core network, the access point comprising:
a processor and a receiver configured to receive from a core network entry device a command message comprising at least part of at least one temporary identifier allocated by the core network entry device to at least one terminal managed by the core network entry device for communicating with the core network and which has not heeded a backoff time with which the at least one terminal has been associated, at least part of said at least one temporary identifier being used by the at least one terminal when communicating with said access point and enabling the access point to identify requests sent by the at least one terminal, the command message requesting blocking by the access point of all or some requests emitted by a sending terminal which contain at least part of said at least one temporary identifier, the access point configured to, on receipt of a request sent by said sending terminal:
verify whether the received request comprises at least part of the at least one temporary identifier included in the command message, and is to be blocked conforming to the command message;
upon a determination that the received request comprises at least part of the at least one temporary identifier included in the command message and is to be blocked conforming to the command message, block the request at the access point; and
otherwise, transmit the received request to the core network entry device.

17. A communication system comprising:
the core network entry device according to claim 15; and
the access point, the access point comprising a processor and a receiver configured to receive from the core network entry device the command message comprising at least part of at least one temporary identifier allocated by the core network entry device to the at least one terminal managed by the core network entry device for communicating with the core network and which has not heeded a backoff time with which the at least one terminal has been associated, at least part of said at least one temporary identifier being used by the at least one terminal when communicating with said access point and enabling the access point to identify requests sent by the at least one terminal, the command message requesting blocking by the access point of all or some of the requests emitted by the sending terminal which contain at least part of said temporary identifier, the access point configured to, on receipt of a request sent by said sending terminal:
- verify whether the received request comprises at least part of the at least one temporary identifier included in the command message, and is to be blocked conforming to the command message;
- upon a determination that the received request comprises at least part of the at least one temporary identifier included in the command message and is to be blocked conforming to the command message, block the request at the access point; and
- otherwise, transmit the request to the core network entry device.

18. The communication system according to claim 17, wherein the core network entry device comprises:
- Serving GPRS Support Node (SGSN) equipment when the mobile access network is a second or third generation network; or
- Mobility Management Entity (MME) equipment when the mobile access network is a fourth-generation network; or
- Access and Mobility management Function (AMF) equipment when the mobile access network is a fifth-generation network.

* * * * *